No. 658,140. Patented Sept. 18, 1900.
J. E. CONWAY.
CORN HARVESTER.
(Application filed Oct. 28, 1899.)
(No Model.) 3 Sheets—Sheet 1.

Witnesses
John E. Conway, Inventor
By his Attorneys.

No. 658,140. Patented Sept. 18, 1900.
J. E. CONWAY.
CORN HARVESTER.
(Application filed Oct. 28, 1899.)

(No Model.) 3 Sheets—Sheet 2.

Witnesses  John E. Conway, Inventor
By his Attorneys,

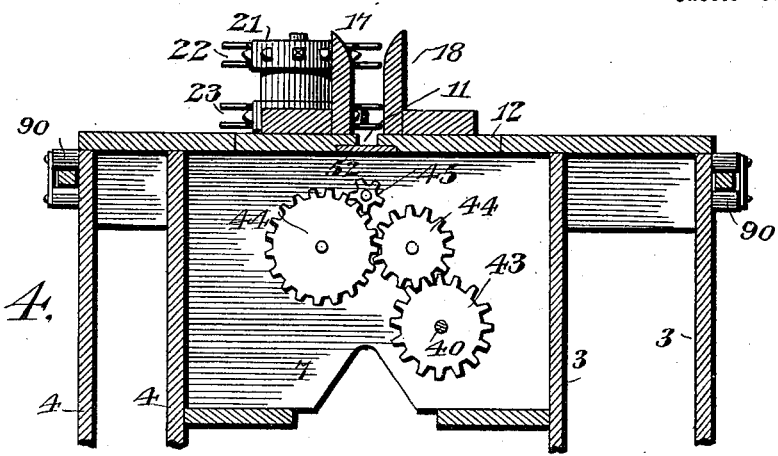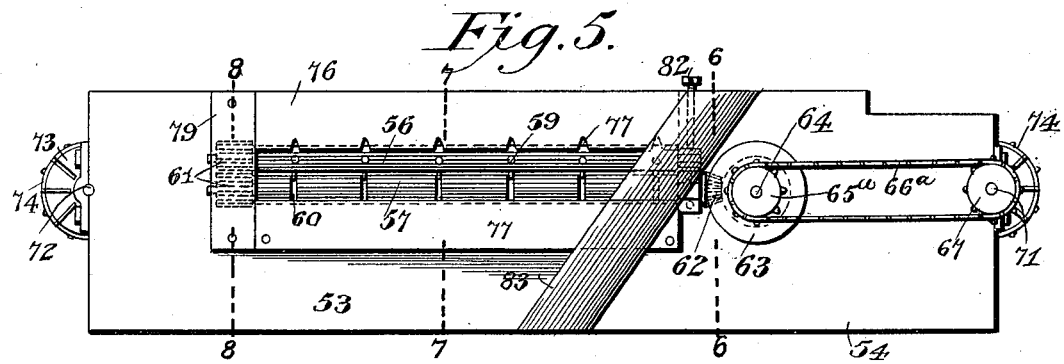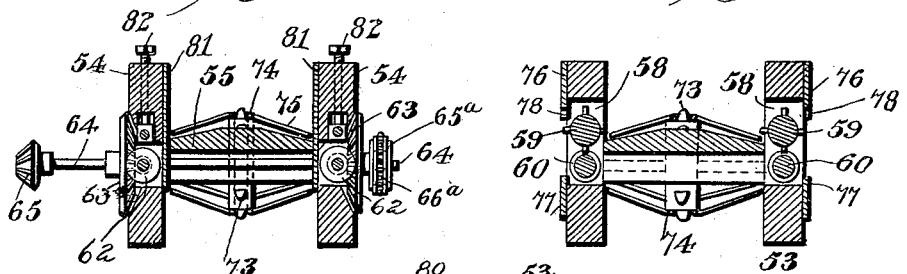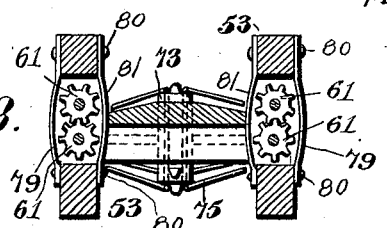

UNITED STATES PATENT OFFICE.

JOHN EDWARD CONWAY, OF OSGOOD, IOWA.

CORN-HARVESTER.

SPECIFICATION forming part of Letters Patent No. 658,140, dated September 18, 1900.

Application filed October 28, 1899. Serial No. 735,091. (No model.)

*To all whom it may concern:*

Be it known that I, JOHN EDWARD CONWAY, a citizen of the United States, residing at Osgood, in the county of Palo Alto and State of Iowa, have invented a new and useful Corn-Harvester, of which the following is a specification.

My invention relates to improvements in corn-harvesters; and my object is to provide an agricultural machine of this character which will gather the ears of corn from the standing stalks, strip them of their husks, and finally deposit the husked ears into a wagon or other receptacle.

Figures 1, 9:
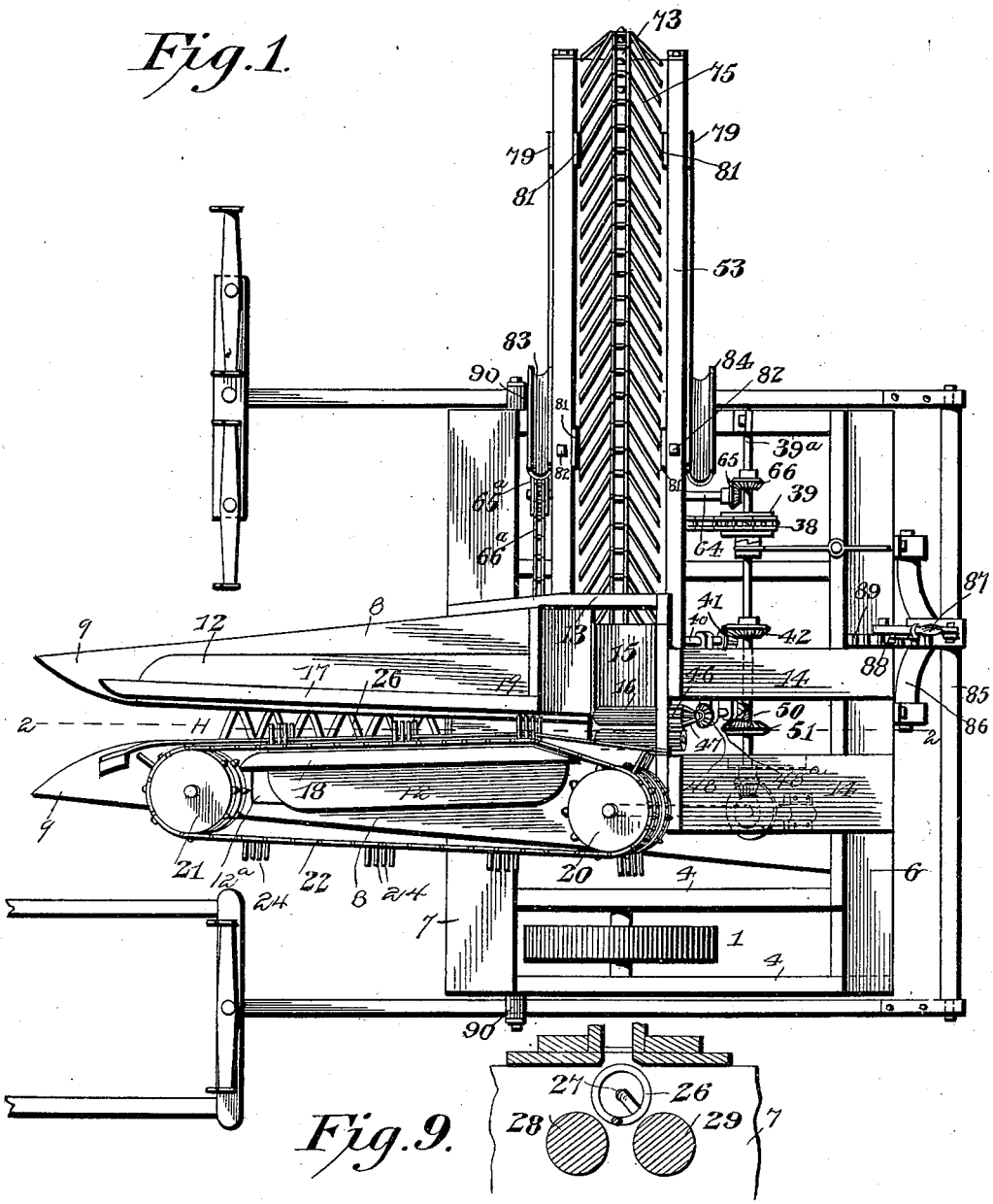
Figure 2:
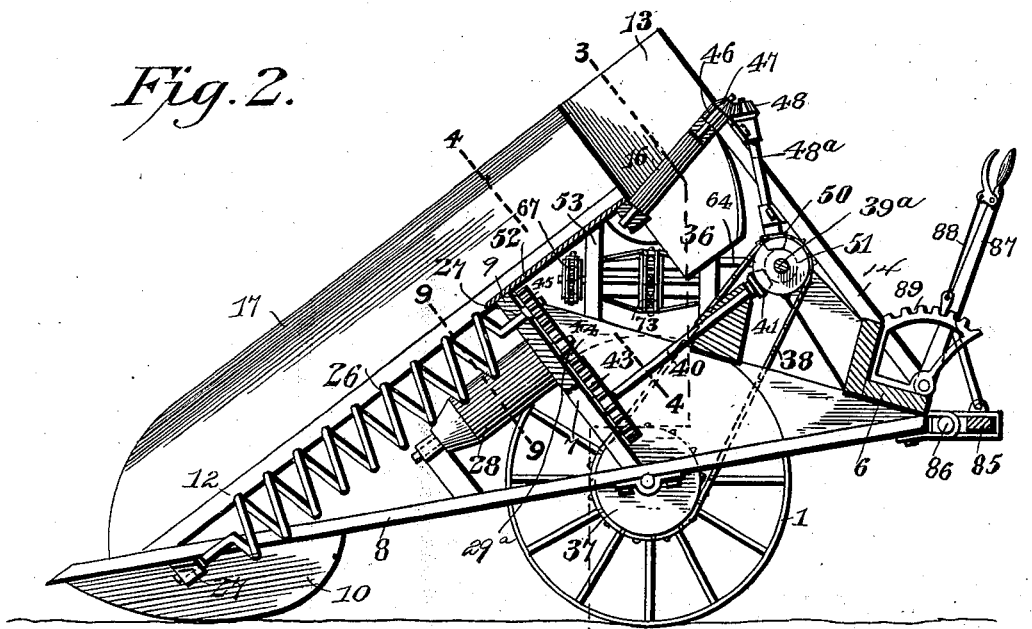
Figure 3:
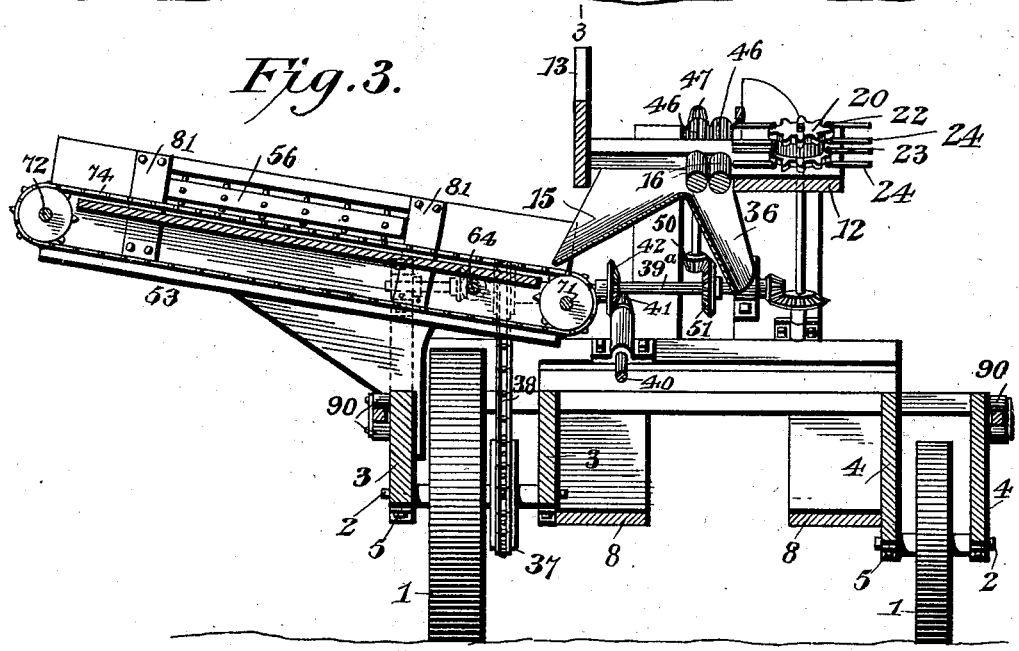

In the drawings, Figure 1 is a top plan view of my corn-harvester complete. Fig. 2 is a vertical central section on line 2 2 of Fig. 1. Fig. 3 is a section on line 3 3 of Fig. 2, the supporting-wheels being shown in elevation. Fig. 4 is a section on line 4 4 of Fig. 2. Fig. 5 is a side elevation of the husking-box. Fig. 6 is a section on line 6 6 of Fig. 5 looking to the right. Fig. 7 is a section on line 7 7 of Fig. 5. Fig. 8 is a section on line 8 8 of Fig. 5 looking to the left. Fig. 9 is a transverse section taken through the stalk-race and stalk-rollers.

Referring to the numerals of reference, indicating corresponding parts in the several views, 1 1 indicate the wheels of my harvester, upon the short axles 2 of which the entire mechanism is designed to be supported and balanced in a manner to permit the front or gathering end to be readily tilted by the operator when it is desired to position the device for harvesting or for transportation, as the case may be.

The frame of the machine is approximately oblong in plan and is composed of two pairs of triangular end plates 3 and 4, at the pendent corners of which are located the bearings 5 for the short shafts 2. These end plates, which extend longitudinally with respect to the complete harvester, but transversely of the frame proper, are connected at the rear edge of the frame by a top rail 6, extending entirely across the machine, and a front frame-plate 7 connects the front inclined edges of the inner adjacent plates 3 and 4 and constitutes, in effect, the supporting-plate for the gathering mechanism. The upper end of this front frame-plate 7 may extend to the adjacent ends of the outer end plates above the wheels 1, or any other means for properly spacing and securing the plates may be provided.

8 8 indicate the gatherer-beams, extending from the under side of the top rail 6, adjacent to the inner plates 3 and 4, to a point considerably in advance of the frame, where their somewhat-flared gatherers 9 are located in such relation as to permit the entrance between them of the cornstalks. These beams 8 lie in the same plane with the lower inclined edges of the frame-plates, so that they assume a slight angle to a horizontal plane when the runners 10 on the under sides of the front ends of the gatherers are brought into contact with the ground during the harvesting of the corn.

11 indicates the stalk-race of the gatherer, defined between the substantially-parallel contiguous edges of a pair of race-plates 12, extending upwardly and rearwardly from the gatherer-beams 8 at the bases of the gatherers, supported upon the upper edge of the front frame-plate 7 and connected therebeyond by an angular frame 13, supported by forwardly-inclined standards 14, carried by the top rail 6. One of the race-plates 12 extends farther to the rear than the other, and the opening thereby defined and embraced within the angular connecting-frame is designed to constitute an opening to the ear-chute 15, immediately above which are located a pair of contiguous parallel initial husking-rolls 16, having their contacting edges in practical alinement with the stalk-race.

17 and 18 indicate a pair of vertical longitudinally-extending ear-boards rising from the race-plates 12, adjacent to their contiguous edges and defining an ear-race or elongated hopper 19, extending practically from the gatherers 9 to the initial husking-rolls 16.

20 and 21 indicate a pair of double conveyer-drums mounted on vertical shafts located at the opposite ends of the longer race-plates 12 and around which extend upper and lower endless conveyer-chains 22 and 23, provided, respectively, with laterally-extending fingers 24, which extend across the ear-race adjacent to its top and bottom as the inner side strands of the chains pass in contact with the inner face of the ear-board 18.

It will be seen that the parts 12 and 18 at one side of the stalk-race terminate short of the forward end of the portion 8 to accommodate the conveyer-drum 21, the ends of the ear-board 18 and plate 12 being supported upon a block 12ª to hold them in proper position with respect to the corresponding parts.

26 indicates a spiral stalk-feeder extending immediately under the stalk-race and supported in suitable bearings 27 at the front end of the gatherer-frame and in plate 7, respectively.

28 and 29 indicate a pair of stalk-rolls located below and substantially parallel with the feeder 26 and adjacent to the face of the front frame-plate 7, through which the rear ends of their shafts 29ª extend.

36 indicates a husk-chute extending from a point immediately under the initial husking-rolls 16 and designed to receive corn tops, stems, and a part of the husks in a manner to be described.

The mechanism thus far described comprehends the primary elements of the gathering mechanism, and I shall now proceed to describe the gearing or power-transmitting mechanism for transmitting motion to these several elements in the proper directions.

37 indicates a sprocket-wheel mounted on one of the short shafts 2 and geared by means of a sprocket-chain 38 with a sprocket-wheel 39, keyed upon what I will term the "driving-shaft" 39ª, mounted in suitable bearings and extending parallel and adjacent to, though in a slightly-higher plane than, the rail 6.

40 indicates a shaft carried in suitable bearings, provided at one end with a bevel-gear 41, meshing with a similar gear 42, carried by the driving-shaft, and at its opposite end with a spur-gear 43, meshing with one of a pair of twin spur-gears 44, keyed upon the shaft of the stalk-rolls, and one of said last-named gears being in mesh with a spur-gear 45, keyed at the rear end of the shaft of the spiral stalk-feeder.

The initial husking-rolls 16 are geared together by intermeshing terminal pinions 46, to the outer face of one of which is secured a bevel-pinion 47, meshing with a similar pinion 48, mounted upon a shaft 48ª in suitable bearings, and provided at its opposite extremity with a bevel-pinion 50, meshing with a bevel-gear 51, keyed upon the driving-shaft 39ª.

Considering the machine as now described as an entirety, inasmuch as it may be employed for the harvesting of corn without the coöperation of the husking mechanism to be described, the harvester is propelled or drawn in the usual manner by draft-animals and the throat of the gatherer is presented to the stalks successively. As the machine advances the stalk will advance along the stalk-race until it is presented to and is engaged by the spiral feeder, the rotation of which tends to urge the stalk along the race, and simultaneously the ears of corn will pass into the ear-race between the ear-boards 17 and 18, where they will be engaged and urged rearwardly by the fingers extending across the race from the conveyer-chains.

By reason of the fact that the race-plates are disposed at a considerable angle the ears as they travel toward the upper end of the race are brought into contact with the faces of the race-plates and being unable to pass through the narrow stalk-race the ear will be pulled from the stalk. It sometimes happens, however, that the force exerted will cause the uprooting of the stalk before the ear is detached. It is therefore necessary to provide means for retaining the uprooted stalk in order to effect the detachment of the ear. For this purpose I provide the stalk-rolls heretofore described. The uprooted stalk urged rearwardly by the advance of the machine and by the advance of the feeder will be presented between these rolls, which rotate in opposite directions and gripping the stalk pull it downwardly to effect the separation from the ear, this separation being facilitated by the glancing blow upon the stalk at a point between the stalk-race and the stalk-rolls by the successive convolutions of the spiral feeder.

If desired, a stalk cutter or blade 52 may be disposed across the stalk-race adjacent to its upper end; but ordinarily the ear will have been separated from the stalk before it has advanced to the cutter.

The separated ears will be conveyed between the ear-boards until they are deposited upon what I have seen fit to term the "initial" husking-rolls 16, which are intended to grip and detach tops, stems, or even adhering portions of stalks before the ear is finally deposited through the ear-chute, from whence ordinarily it is directed to a husking-box comprehending husking mechanism which removes the husks and finally discharges the ears into a wagon or other depository.

A husking-box 53 constructed in accordance with my invention is illustrated in the drawings as extending transversely at the rear end of the harvester, with its inner end immediately under the ear-chute and its outer elevated extremity arranged to deposit the husked ears into a wagon. The husking-box comprises side plates 54 and an intermediate floor 55, formed with a longitudinal medial rib or peak designed to cause the ears to gravitate into contact with the side walls or plates.

In each of the plates 54 are mounted a pair of husking-rolls 56 and 57, located within elongated openings 58 in the plate 54 and having their peripheries practically flush with the inner faces of said plates. One roll of each pair is provided with a series of husking-pins 59, and the other roll is formed with a series of depressions 60 for their reception.

In order to effect the opposite rotation of these rolls—that is to say, the rolls of each pair—they are geared together by intermeshing terminal pinions 61, and one of the rolls of each pair is provided, preferably at the end nearest the machine, with a bevel-pinion 62, meshing with a bevel-gear 63 upon the driving-shaft 64 of the husking-box. This shaft extends through the box transversely under the floor 55 and is provided upon one end with a bevel-pinion 65, meshing with a similar pinion 66 on the driving-shaft of the harvester, and at its opposite end is provided with a sprocket 65ª, carrying a chain 66ª, leading to a second sprocket 67, mounted upon one of the conveyer-shafts 71.

71 and 72 indicate a pair of conveyer-shafts located at the opposite ends of the husking-box and provided with sprocket-wheels 73, around which passes the husking conveyer-chain 74, provided with oppositely-extending fingers 75, inclined from the body of the chain toward the lower end of the box and conforming practically to the inclination of the floor at opposite sides of its peak.

It will now be seen that as the ears are dropped from the initial husking-rolls through the ear-chute they will be deposited upon the conveyer of the husking-box. Movement of the conveyer will now cause the ears to travel toward the upper end of the box, and the spring-fingers will urge them with slight pressure against the husking-rolls. The husking-pins coming into contact with the husks will cause the latter to be gripped between the rolls, and as the latter are rotated the husks will be stripped from the ears and will be carried between the rolls to the exterior of the husking-box.

The removal of the husks from the surfaces of the rolls is effected by scraper-plates 76 and 77, secured to the sides of the box and having their contiguous edges in yielding contact with the upper and lower rolls, respectively, the scrapers 76 being provided with notches 78 for the accommodation of the husking-pins. End scrapers 79 may also be located at the ends of the longitudinal scrapers or clearing-plates in order to protect the pinion 61, and, if desired, tension-screws 80 may be provided for regulating the tension upon the upper rolls 56, and guard-plates 81 may be mounted upon the inner faces of the plates 54 to protect the ends of the rolls and the pinions.

The gears 63 upon the driving-shaft of the husker are preferably connected thereto by set-screws 82, passing through their hubs, in order that by the loosening of these screws the gears may be slipped out of mesh with the bevel-pinion 62, thereby throwing the husking-rolls out of operation when it is simply desired to employ the conveyer. In like manner if it is not desired to entirely husk the corn the upper pinions 61 may in like manner be disconnected from their shafts and moved out of mesh with the corresponding pinions on the lower rolls, which operation will cause the rolls carrying the husking-pins to remain idle.

83 and 84 indicate husk-chutes located at the opposite sides of the husking-box and designed to receive and to direct the discharge of the husks as they are scraped from the husking-rolls and dropped toward the lower end of the box.

Any suitable draft device may be employed in connection with my harvester; but I prefer to mount an equalizer-beam 85 immediately in the rear of the rail 6 upon a rocking bar 86 and connected to a tilting lever 87, pivoted upon the harvester-frame and provided with a spring-latch 88 and rack 89, by means of which the rocking bar may be oscillated to bring the line of draft above or below the axis of the bar, and thereby effect the tilting of the gatherer-frame, as it is desired to throw the gatherers into operative relation with the ground or to elevate them to facilitate the transportation of the device.

A suitable draft-tongue is connected to one end of the equalizer-beam 84, and a thill-pole is connected at its opposite end, both the tongue and pole being passed forwardly adjacent to the end plates of the frame and between rollers 90, mounted on the end plates 3 and 4.

From the foregoing it will be observed that I have produced an effective corn-harvester embodying mechanism for removing the ears from the stalks and for quickly husking the ears and conveying them to a depository; but while the present embodiment of my invention appears at this time to be preferable I do not wish to be understood as limiting myself to the structural details defined; but, on the contrary, I desire to reserve the right to effect such changes, modifications, and variations as may be comprehended within the scope of the protection prayed.

What I claim is—

1. In a corn-harvester, the combination with a frame, of a stalk-race, an ear-race thereabove, ear-conveying mechanism, stalk-rolls below the stalk-race, and a spiral feeder intermediate of the stalk race and rolls.

2. In a corn-harvester, the combination with a frame and substantially-parallel race-plates defining a stalk-race, a pair of vertical ear-boards rising from the race-plates and defining an ear-race above and wider than the stalk-race, ear-conveying mechanism adjacent to the top and bottom of the ear-race, a spiral feeder immediately below the stalk-race, stalk-rolls below the feeder, and means for actuating the conveyer mechanism, feeder and rolls.

3. In a corn-harvester, the combination with a frame and a stalk-race obstructed by a stalk-cutter, an ear-race above the stalk-race and an ear-conveyer within the ear-race, of mechanism located below the stalk-race arranged to urge the stalks toward the cutter and to exert a downward pull upon the stalks at a point in advance of the cutter.

4. In a corn-harvester, the combination with a frame, of a stalk-race and initial husking-rolls at the end of the stalk-race and having their axes parallel therewith, an ear-race above the stalk-race, ear-conveying mechanism within the ear-race, stalk-feeding mechanism below the stalk-race, a husk-chute and an ear-chute oppositely inclined and located respectively directly under and to one side of the initial husking-rolls and means for operating the rolls and conveying and feeding mechanisms.

5. In a corn-harvester, the combination with a frame, of stalk and ear races, an endless conveyer within the ear-race provided with laterally-extending fingers, a spiral feeder adjacent the stalk-race, stalk-rollers below the spiral feeder, and means for operating the conveyer, the feeder and the rollers.

6. In a corn-harvester, the combination with a frame, of a gatherer, a husking-box adapted to receive from the gatherer, said box comprising side plates provided respectively with a pair of longitudinally-disposed husking-rolls, an intermediate floor inclined from its center to its side edges, and an endless conveyer movable over and located in proximity to the floor and provided with oppositely-extending inclined fingers.

7. In a corn-harvester, the combination with a frame, of a gatherer and a husking-box adapted to receive from the gatherer, said box comprising side plates provided with independent husking-rolls, means for throwing certain or all of the rolls out of operation, a floor inclined from its center toward its side edges, and a conveyer movable over said floor.

8. In a corn-harvester, the combination with a frame, of a gatherer and a husking-box adapted to receive from the gatherer and comprising a floor and side plates, a pair of husking-rolls carried by one of said plates and provided respectively with husking-pins and corresponding depressions, scraper-plates in proximity to the rolls, one of said plates being provided with notches to accommodate and effect the clearing of the husking-pins, and means for operating said roll.

In testimony that I claim the foregoing as my own I have hereto affixed my signature in the presence of two witnesses.

JOHN EDWARD CONWAY.

Witnesses:
W. A. CONWAY,
D. F. CONWAY.